United States Patent [19]
Hoadley

[11] 3,970,050
[45] July 20, 1976

[54] TWO-STAGE ROTARY ENGINES
[76] Inventor: Harry W. Hoadley, 139 Laquineo St., Findlay, Ohio 45840
[22] Filed: Mar. 7, 1975
[21] Appl. No.: 556,433

[52] U.S. Cl............................ 123/8.05; 123/8.45; 418/61 A; 418/122; 418/86
[51] Int. Cl.² ........................................ F02B 53/08
[58] Field of Search................ 123/8.01, 8.05, 8.45; 418/61 A, 86, 120, 122

[56] References Cited
UNITED STATES PATENTS

| | | | |
|---|---|---|---|
| 2,298,525 | 10/1942 | Briggs | 418/86 X |
| 3,056,391 | 10/1962 | Hoadley | 123/8.01 |
| 3,139,722 | 7/1964 | Yokoi | 123/8.05 X |
| 3,229,675 | 1/1966 | Hoadley | 123/8.45 |
| 3,266,469 | 8/1966 | Sink | 123/8.45 X |
| 3,667,877 | 6/1972 | Lamm | 418/122 X |
| 3,742,917 | 7/1973 | Butler | 123/8.05 |
| 3,799,705 | 3/1974 | Gunthard | 123/8.45 X |

FOREIGN PATENTS OR APPLICATIONS 213,454   5/1968   U.S.S.R. ........................... 418/86

*Primary Examiner*—Carlton R. Croyle
*Assistant Examiner*—Michael Koczo, Jr.
*Attorney, Agent, or Firm*—D. Paul Weaver

[57] ABSTRACT

A pair of sealed engine rotors are connected by links and cranks to a single shaft for simultaneous operation one-quarter turn out of phase. The use of internal gears and eccentrics for driving the two rotors is avoided. The expanding charge in the chamber containing the second rotor is diverted back into the chamber for the first rotor whereby this charge may further expand and assist in driving the first stage rotor. The rotor chamber profiles are free of abrupt humps, thus avoiding seal shock and wear and chatter marks on chamber surfaces. Vaporized fuel is utilized to cool the engine by passage through the centers of the rotors. Increased compression, greater rotor speed and more usable power are fully-achieved features.

5 Claims, 8 Drawing Figures

U.S. Patent  July 20, 1976  Sheet 3 of 3  3,970,050
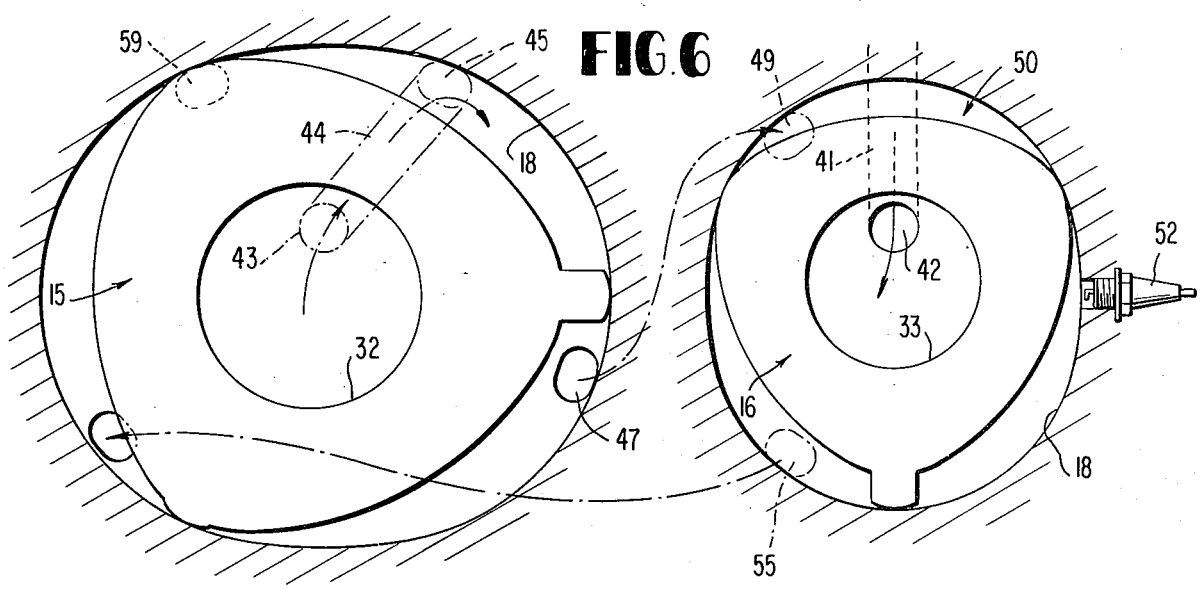
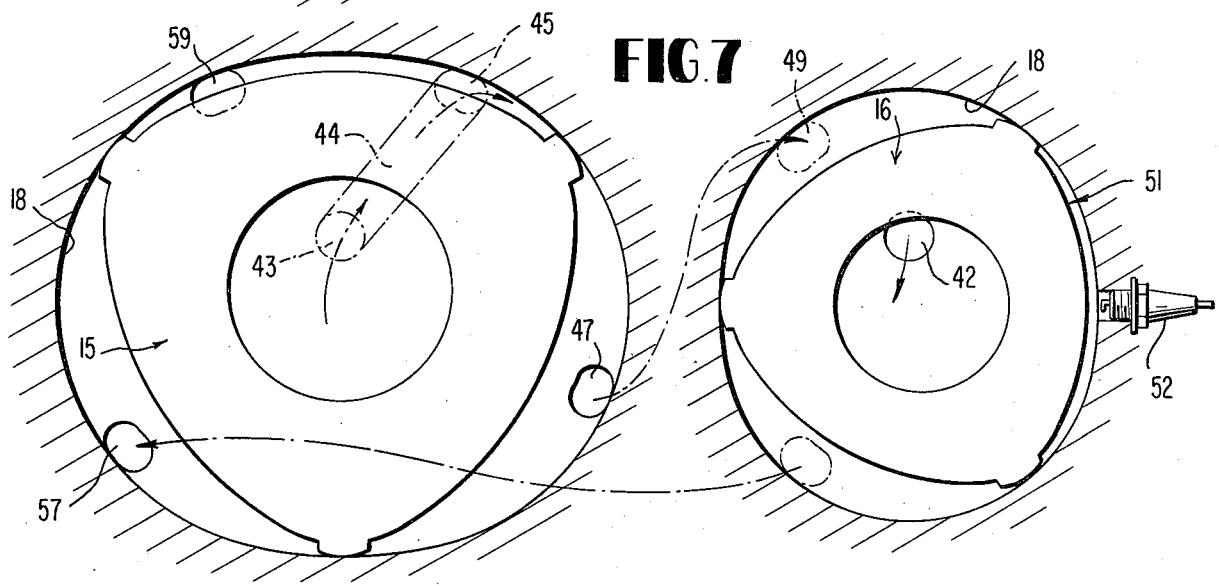
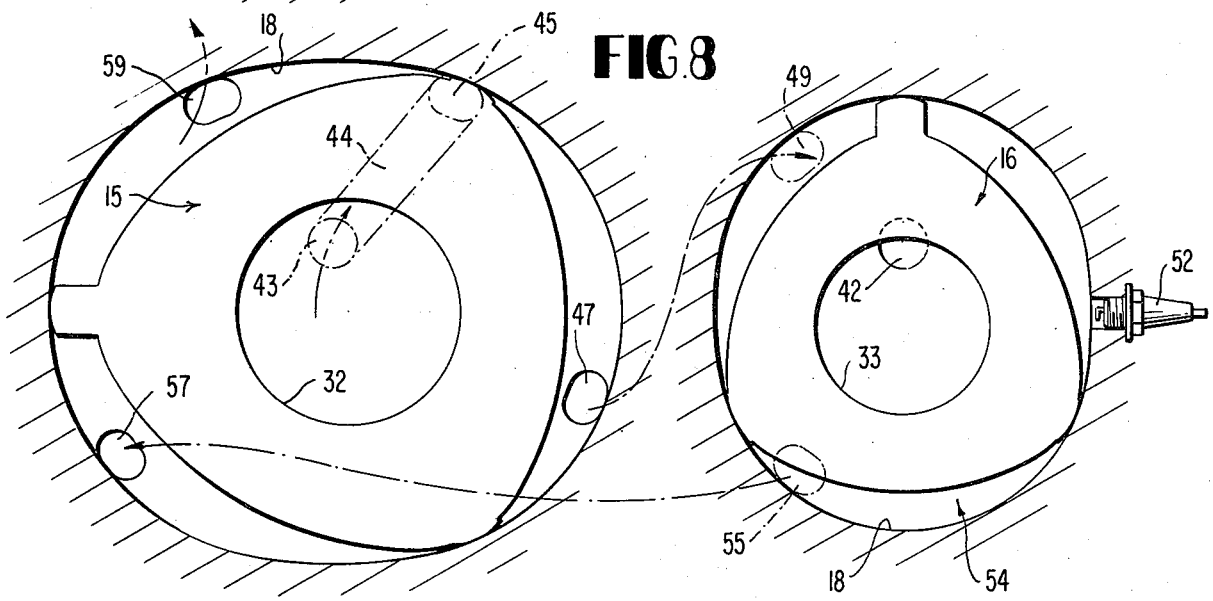

TWO-STAGE ROTARY ENGINES

BACKGROUND OF THE INVENTION

The inherent advantages of rotary engines over piston engines has been increasingly recognized in recent times. Nevertheless, the piston engine has remained the standard of the automotive industry mainly because of its overall superior performance characteristics. However, the need for a lighter weight, more efficient and less complicated engine continues to exist and this need has become more urgent due to the worldwide energy crisis.

Accordingly, it is the objective of this invention to provide a more practical and economical rotary engine which is free of many of the known difficulties encountered with such engines in the prior art. More particularly, according to the invention, the means for connecting the single output shaft of the engine with its two-stage rotors has been greatly simplified and results in fewer parts and reduced power loss and higher speed rotor movement in the engine. The rotor seals have been improved and cooling of the engine has been simplified so that the need for coolant pumps and radiator means no longer exists. The cold nature of evaporated fuel is taken advantage of for direct cooling of the two-stage rotors at their centers. Engine heat, which would otherwise be lost to the atmosphere, is thus put to a useful purpose, and no extra equipment is necessary for the cooling operation.

The present engine is very compact and lightweight and also extremely sturdy and durable so as to give long trouble-free performance. Since the rotor chambers are free of abrupt profile changes or humps, the engine can turn much faster and the power impulses are not reduced. The three-sided rotors employed in the engine produce smooth power at the output shaft of the two-stage engine, the power at the first stage being boosted or increased by power from the smaller secondary stage.

Other features and advantages of the invention will become apparent during the course of the following description.

BRIEF DESCRIPTION OF DRAWING FIGURES

FIGS. 5 through 8 are diagrammatic views of engine operation at quarter turn stages of the engine rotors during a complete rotational cycle.

DETAILED DESCRIPTION

Figure 4:
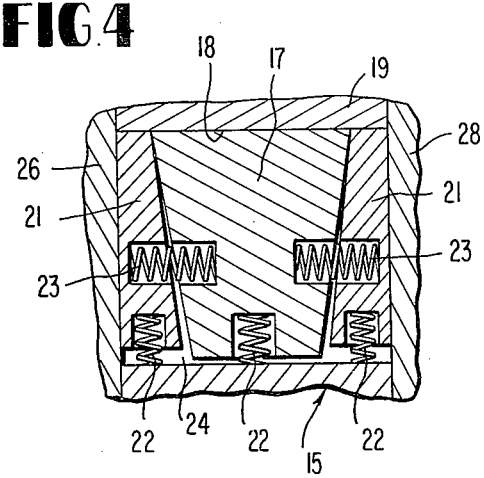
FIG. 4 is an enlarged fragmentary cross-sectional view taken through a seal assembly and associated parts.

Referring to the drawings in detail, wherein like numerals designate like parts, reference is made first to FIGS. 1 through 4 in which the numerals 15 and 16 designate first and second stage three-sided engine rotors, with the primary stage rotor 15 being considerably larger than the second stage rotor, as depicted in the drawings. Each rotor 15 and 16 is equipped with three, equidistantly spaced apex seal assemblies, each assembly consisting of a center wedge-shaped section 17 which tapers radially inwardly and has its outer tip rounded where it projects beyond the rotor for sliding contact with the generally elliptical wall 18 of the respective larger and smaller rotor housing sections 19 and 20. Each seal assembly has side sealing sections 21 located in grooves formed in the opposite end faces of the center section 17. The outer tips of the side sections 21 are also rounded in conformity with the tip shape of the center section 17. The three sections 17 and 21 are biased radially outwardly on the rotor 15 or 16 by springs 22, and the side sections 21 are similarly biased axially outwardly on the rotors by springs 23 held in cavities formed in the several seal sections. The three seal assemblies of each rotor 15 and 16 constructed as shown in FIG. 4 are contained in radial slots 24 and 25 of the respective rotors 15 and 16.

Additionally, the opposite end faces of the rotors 15 and 16 are sealed with respect to end plates 26 and 27 and an intermediate plate 28 by segmental arcuate seals 29 extending between the radial seal assemblies and mounted within grooves 30 in the opposite end faces of the rotors.

Figure 1:
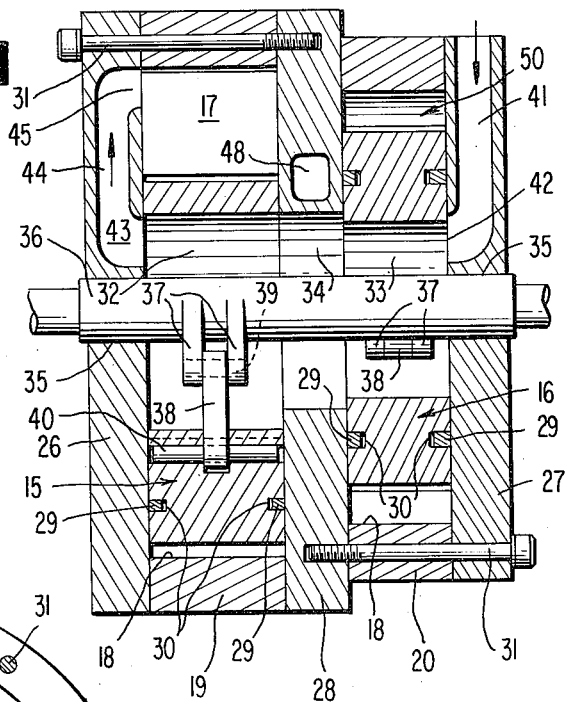
FIG. 1 is a central vertical section through a two-stage rotary engine embodying the invention.
Figure 2:
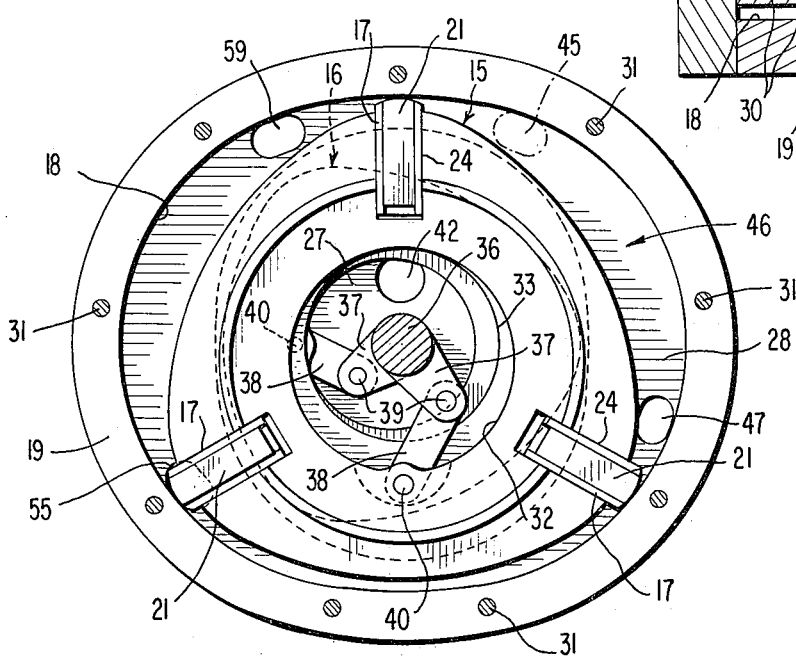
FIG. 2 is an end elevational view of the engine with the cover plate for the first or primary stage removed, parts in section.
Figure 5:
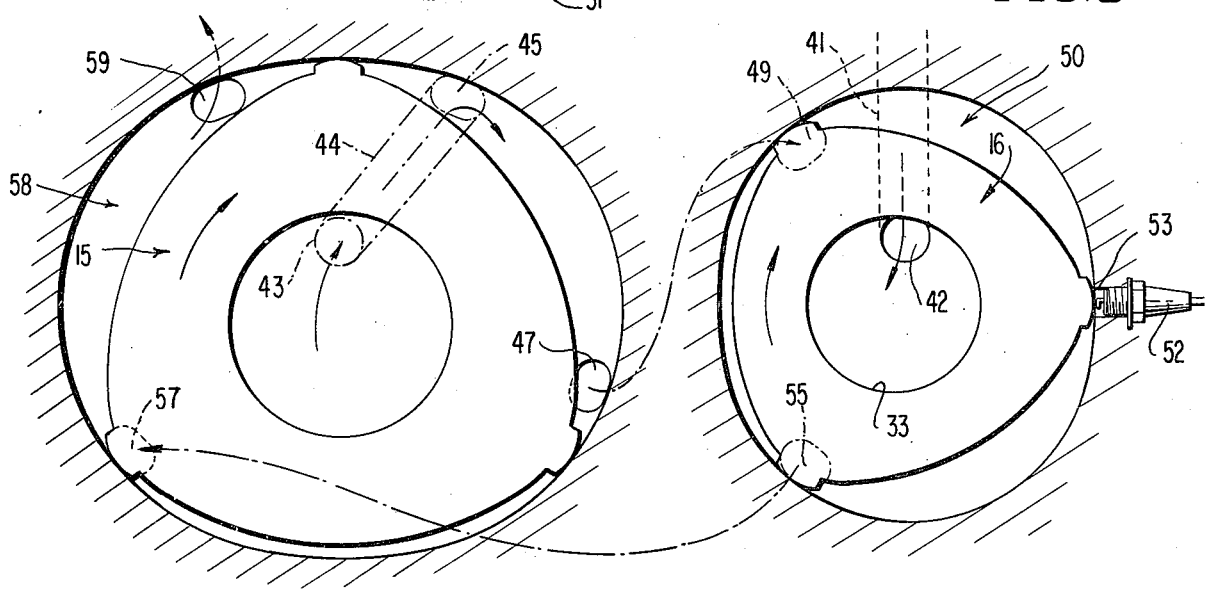

As best shown in FIG. 1, the ring-like housing sections 19 and 20 receive the first and second stage rotors 15 and 16 therein and are of the same axial dimension as the rotors. The end plate 26 covers the outer side of primary rotor 15 and housing section 19 and the end plate 27 covers the outer side of second stage rotor 16 and housing section 20. The intermediate plate 28 is located between the two housing sections 19 and 20 and covers the interior sides of rotors 15 and 16. The end plates 26 and 27 are secured in assembled relationship with the intermediate plate 28 and the two housing sections 19 and 20 by opposing groups of bolts 31.

It may now be clearly seen by reference to FIGS. 1 and 4 that in the assembled engine the center sections 17 of each radial seal assembly wipe the interior surfaces 18 of housing sections 19 and 20 while the two side sections 21 wipe the opposing flat faces of the end and intermediate plates 26, 27 and 28. Also, these plate faces are engaged by the segmental seals 29, as described, so that each rotor 15 and 16 is completely sealed within its operating chamber.

Each rotor 15 and 16 has a relatively large central opening 32 and 33 formed therethrough in registration with a similar opening 34 of intermediate plate 28. These three aligned openings form a cooling chamber for the engine which receives vaporized fuel in a cool state for heat exchange relationship with the surrounding hot metal, as will be further described. The two end plates 26 and 27 have aligned smaller openings 35 for the support of a rotary power output shaft 36 of the engine suitably journaled therein. The openings 35 may be equipped with suitable bearings, not shown.

The engine shaft 36 has pairs of integral crank lugs 37 adjacent the two rotors 15 and 16 and projecting into the openings 32 and 33 thereof, as shown. The pairs of crank lugs on the shaft 36 are spaced 90 degrees circumferentially to establish the one-quarter turn out of phase relationship of the two rotors 15 and 16 in the engine. Short connecting links 38 have corresponding ends pivotally connected as at 39 to the crank lugs 37 and have their opposite ends pivotally connected to wrist pins 40 of the two rotors 15 and 16. As a result of this simple arrangement, costly internal gearing and associated eccentrics are eliminated in the engine and the two rotors 15 and 16 are floatingly disposed in their operating chambers in properly phased relation and directly drivingly connected with the output shaft 36 in a manner similar to the connections of engine pistons to crank shafts in piston engines. The construction is much simpler, lighter and much less costly than the usual constructions in rotary type engines and constitutes a major feature of the invention.

Continuing to refer to the drawings, the end plate 27 has a radial fuel intake passage 41 for vaporized gasoline or the like leading inwardly to an axial port 42 which delivers the fuel directly to the secondary rotor opening 33, where the cold vaporized fuel then passes through the three aligned openings 33, 34 and 32, FIG. 1, to absorb heat in the cooling of the engine before entering a radial port 43 formed in the opposite end plate 26. From this port, the now warmed fuel passes outwardly through a radial passage 44 in the end plate 26 to a reversely directed axial port 45 which delivers the fuel to a first stage compression space 46 of the engine.

Figure 3:
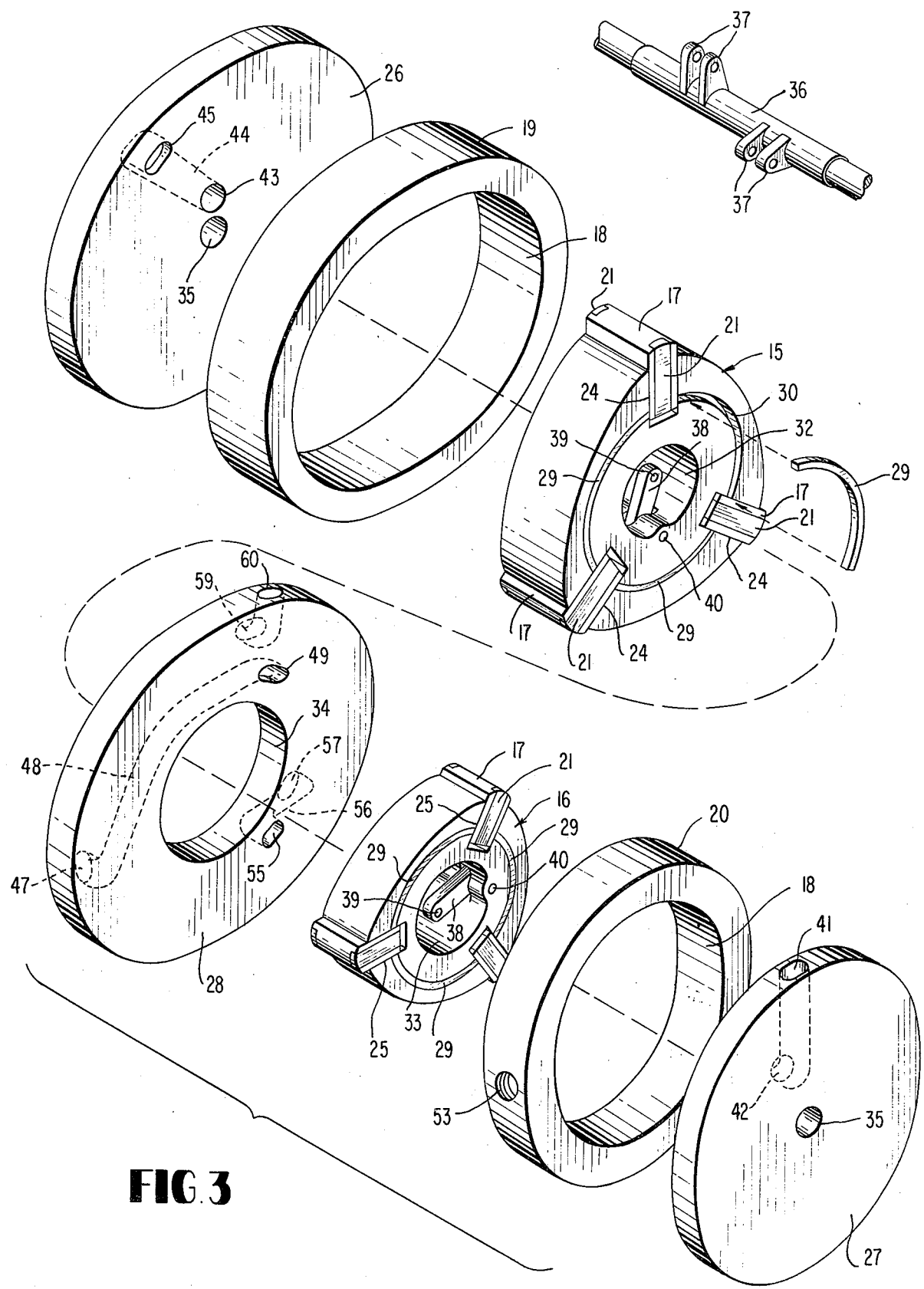
FIG. 3 is an exploded perspective view of the engine.

Eventually, the charge will leave the first stage chamber through another port 47 opening through one face of the intermediate plate 28, see FIG. 3, and will pass through an internal duct or passage 48 in the intermediate plate to an outlet port 49 in the opposite face thereof, delivering the charge to the second stage chamber 50 of the engine. Here the charge is compressed to a greater degree in the second stage space 51, FIG. 7, which compression space is directly adjacent to a spark plug 52 secured within a radial threaded opening 53 of the second stage housing section 20. After full compression, the charge in space 51 is fired by the spark plug 52 which increases the pressure to approximately three times the value before firing. This high pressure is utilized to drive the second stage rotor 16 and expansion occurs within the space 54 of the second stage engine chamber.

As the second stage rotor 16 continues to turn, the expanding charge exits the second stage chamber through another port 55 in the adjacent face of intermediate plate 28 and then flows through another internal passage 56 of the intermediate plate 28 and through a port 57 in the first stage side thereof to deliver the charge back into a first stage space 58, where the pressurized charge is further utilized as booster power to turn the first stage rotor 15. As this rotor turns, the charge is further expanded and eventually is exhausted through an exhaust port 59 in the first stage side of the intermediate plate 28, the exhaust then being delivered outside of the engine through a radial exhaust passage 60 in the intermediate plate, see FIG. 3. This completes the two-stage operation of the engine, and the engine rotors have now both completed a full revolution with the engine shaft 36. Because the rotors are three-sided, the power cycle is repeated three times during each revolution.

FIGS. 5 through 8 schematically depict a full revolution cycle of operation in quarter turn stages of the two engine rotors 15 and 16 relative to the stationary chamber and fuel port components.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A rotary engine comprising a two-stage housing means having first and second stage variable volume oblong working chambers whose major axes are substantially perpendicular, first and second stage three-sided rotors movably mounted in said first and second stage working chambers, a single engine output shaft journaled on said housing means for rotation and having cranks adjacent the first and second stage working chambers which are spaced apart substantially ninety degrees circumferentially, connecting links pivotally interconnecting said cranks and rotors in said first and second stage working chambers, spaced seals carried by said rotors and having wiping engagement with peripheral and side walls of said first and second stage working chambers, said rotors having communicating central cooling passage means, said housing means having a fuel intake passage communicating with the rotor cooling passage means and having a delivery passage for fuel leading from the cooling passage means into the first stage working chamber, said housing means additionally having a charge transport passage interconnecting said first stage and said second stage working chambers and delivering a charge from the former to the latter, the housing means having another delivery passage for transporting a fired charge from the second stage chamber back to the first stage chamber and having an exhaust passage leading from the first stage chamber, and fuel ignition means in a compression zone of the second stage working chamber.

2. A rotary engine according to claim 1, and said two stage housing means comprising a pair of ring-like housing sections each adapted to receive one of said rotors, a pair of end plates covering the outer ends of said housing sections and rotors, an intermediate plate separating and covering the interior ends of the housing sections and rotors, and means mechanically coupling said housing sections, end plates and said intermediate plate in assembled relationship and fixedly relative to said rotors.

3. A rotary engine according to claim 2, and said fuel intake passage formed internally and generally radially in one end plate, said delivery passage for fuel formed internally and generally radially in the other end plate, said charge transport passage and said another delivery passage both formed internally and separately in said intermediate plate and opening through the opposite faces thereof, and said exhaust passage formed in the second-named end plate and opening through the exterior thereof.

4. A rotary engine according to claim 1, and said oblong working chambers being roughly elliptical and without abrupt contour irregularities.

5. A rotary engine according to claim 1, and said spaced seals carried by said rotors each comprising a center section and two side sections, and spring means biasing the center and side sections radially outwardly and biasing the two side sections laterally outwardly of the center section.

* * * * *